(12) United States Patent
Sabater et al.

(10) Patent No.: US 10,762,689 B2
(45) Date of Patent: Sep. 1, 2020

(54) METHOD AND APPARATUS FOR SELECTING A SURFACE IN A LIGHT FIELD, AND CORRESPONDING COMPUTER PROGRAM PRODUCT

(71) Applicant: INTERDIGITAL CE PATENT HOLDINGS, Paris (FR)

(72) Inventors: Neus Sabater, Betton (FR); Erik Reinhard, Hédé-Bazouges (FR); Matthieu Hog, Thorigné Fouillard (FR); Elena Garces, Rennes (FR)

(73) Assignee: INTERDIGITAL CE PATENT HOLDINGS, Paris (FR)

( * ) Notice: Subject to any disclaimer, the term of this patent is extended or adjusted under 35 U.S.C. 154(b) by 0 days.

(21) Appl. No.: 16/170,608

(22) Filed: Oct. 25, 2018

(65) Prior Publication Data
US 2019/0130632 A1    May 2, 2019

(30) Foreign Application Priority Data
Oct. 31, 2017   (EP) ..................... 17306492

(51) Int. Cl.
*G06T 15/20* (2011.01)
*G06T 15/40* (2011.01)
(Continued)

(52) U.S. Cl.
CPC .............. *G06T 15/20* (2013.01); *G06T 11/60* (2013.01); *G06T 15/40* (2013.01); *G06T 15/50* (2013.01);
(Continued)

(58) Field of Classification Search
CPC ....... G06T 15/20; G06T 15/40; G06T 15/405; G06T 15/50; G06T 11/60; G06T 19/20;
(Continued)

(56) References Cited

U.S. PATENT DOCUMENTS

| | | | |
|---|---|---|---|
| 7,199,793 B2 | 4/2007 | Oh et al. | |
| 9,113,043 B1 * | 8/2015 | Kim ......................... | G09G 5/00 |

(Continued)

FOREIGN PATENT DOCUMENTS

| | | |
|---|---|---|
| EP | 2244484 | 10/2010 |
| GB | 2488905 | 9/2012 |
| WO | WO2014149403 | 9/2014 |

OTHER PUBLICATIONS

Jarabo et al.—"How do people edit light fields?"—ACM Transactions on Graphics (TOG), ACM, US, vol. 33, No. 4, pp. 1-10—XP058051940—ISSN: 0730-0301—DOI: 10.1145/2601097.2601125—Jul. 27, 2014 (Jul. 27, 2014).

(Continued)

*Primary Examiner* — Todd Buttram
(74) *Attorney, Agent, or Firm* — Robert D. Shedd

(57) ABSTRACT

Selecting at least one surface in a light field, such as a light field associated with multiple views corresponding to different view points of a same scene, may include displaying one of the multiple views as a reference view, selecting at least one surface in the reference view, identifying a set of pixels belonging to the selected surface, which are occluded in the reference view but visible in at least one of the multiple views, projecting the set of pixels into the reference view on the basis of a value of the pixels of the set in the view or views in which they are visible in order to form an upgraded reference view, displaying the upgraded reference view, and updating the selected surface in the upgraded reference view.

18 Claims, 4 Drawing Sheets

(51) Int. Cl.
G06T 19/20 (2011.01)
G06T 15/50 (2011.01)
G06T 11/60 (2006.01)

(52) U.S. Cl.
CPC .......... *G06T 19/20* (2013.01); *G06T 2200/21* (2013.01); *G06T 2200/24* (2013.01); *G06T 2207/10052* (2013.01); *G06T 2219/2012* (2013.01); *G06T 2219/2016* (2013.01)

(58) Field of Classification Search
CPC ..... G06T 15/005; G06T 15/503; G06T 15/10; G06T 15/506; G06T 15/80; G06T 15/06
See application file for complete search history.

(56) References Cited

U.S. PATENT DOCUMENTS

| | | | |
|---|---|---|---|
| 2001/0043738 A1* | 11/2001 | Sawhney | G01S 5/163 382/154 |
| 2007/0236507 A1 | 10/2007 | Tigges | |
| 2013/0222633 A1 | 8/2013 | Knight et al. | |
| 2014/0059462 A1 | 2/2014 | Wernersson | |
| 2015/0016712 A1* | 1/2015 | Rhoads | G06K 9/00208 382/154 |
| 2015/0104101 A1 | 4/2015 | Bryant et al. | |
| 2018/0089903 A1* | 3/2018 | Pang | H04N 19/33 |

OTHER PUBLICATIONS

Viola et al.—"Smart visibility in visualization"—Computational aesthetics in Graphics, Visualization and Imaging—pp. 209-216—XP058118849—DOI: 10.2312/COMPAESTH/COMPAESTH05/209-216—ISBN: 3-905673-27-4—May 18, 2005 (May 18, 2005).

Blenderwiki—"3D interaction/navigating/global or local view"—XP055437011—retrieved from the Internet: URL: https://wiki.blender.org/index.php?title=Doc:2.4/Manual/3D_interaction/Navigating/Global_or_Local_View&oldid=158165 [retrieved on Dec. 20, 2017]—Nov. 15, 2011 (Nov. 15, 2011).

Wu Gaochang et al.—"Light field image processing: an overview"—IEEE Journal of Selected Topics in Signal Processing, IEEE, US, vol. 11, No. 7, pp. 926-954—XP011672035—ISSN: 1932-4553—DOI: 10.1109/JSTSP.2017.2747126 [retrieved on Oct. 25, 2017]—Oct. 1, 2017 (Oct. 1, 2017).

Seitz et al.—"Plenoptic image editing"—Sixth International Conference on Computer Vision (IEEE Cat. No. 98CH36271)—Bombay, India—Jan. 7, 1998

Hyun et al.—"Multi-view image matting and compositing using trimap sharing for natural 3D scene generation"—3DTV-Conference: The True Vision—Capture, Transmission and Display of 3D Video, 2008—Istanbul, Turkey—IEEE—May 28-30, 2008.

Djelouah et al.—"N-tuple color segmentation for multi-view silhouette extraction"—Proceedings of the 12th European Conference on Computer Vision ECCV 2012—Florence, Italy, Oct. 7-13, 2012.

Naemura et al.—"3D segmentation of multiview images based on disparity estimation"—Proceedings of the SPIE—The International Society for Optical Engineering—vol. 2727—pp. 1173-1184, SPIE—The International Society for Optical Engineering, Visual Communications and Image Processing '96—Feb. 27, 1996.

Chen et al.—"Image-Based Rendering of Surfaces from Volume Data"—Volume Graphics 2001—pp. 279-295—Proceedings of the Joint IEEE TCVG arid Eurographics Workshop in Stony Brook, New York, USA, Jun. 21-22, 2001.

Hog et al.—"Light Field Segmentation Using a Ray-Based Graph Structure"—European Conference on Computer Vision—ECCV, Amsterdam, Netherlands. pp. 16, Oct. 2016.

Wanner et al.—"Globally consistent depth labeling of 4D light field"—2012 IEEE Conference on Computer Vision arid Pattern Recognition (CVPR)—Jun. 16-21, 2012.

Yang et al.—"All-In-Focus Synthetic Aperture Imaging"—European Conference on Computer Vision—ECCV 2014—13th European Conference, Zurich, Switzerland—Springer—Sep. 6-12, 2014.

Ng, "Digital Light Field Photography", Doctoral dissertation submitted to the Department of Computer Science and the Committee on graduate studies of Stanford University, Jul. 2006.

Wanner etal., "Generating EPI Representation of a 4D Light Fields with a Single Lens Focused Plenoptic Camera",—Advances in Visual Computing—7th International Symposium, ISVC 2011—vol. 6938 of the series Lecture Notes in Computer Science—pp. 90-101—Sep. 26-28, 2011.

Thonat et al.—"Multi-View Inpainting for Image-Based Scene Editing and Rendering", 2016 Fourth International Conference on 3D Vision (3DV), IEEE—Oct. 25-28, 2016.

Sabater et al.—Dataset and Pipeline for Multi-view Light-Field Video—2017 IEEE Conference on Computer Vision and Pattern Recognition Workshops (CVPRW)—Jul. 21-26, 2017.

Kazhdan et al.—"Screened poisson surface reconstruction"—ACM Transactions on Graphics (TOG), vol. 32, No. 3, Article 29—Jun. 2013.

Sorkine et al.—"Laplacian Surface Editing"—Eurographics/ACM SIGGRAPH symposium on Geometry processing—Jul. 2004.

Igarashi et al.—"Implementing As-Rigid-As-Possible Shape Manipulation and Surface Flattening"—Journal of Graphics, GPU, and Game Tools, vol. 14, Issue 1—Jan. 2009.

* cited by examiner

METHOD AND APPARATUS FOR SELECTING A SURFACE IN A LIGHT FIELD, AND CORRESPONDING COMPUTER PROGRAM PRODUCT

1. FIELD

The present disclosure relates to light-field imaging, and to technologies for acquiring and processing light-field data. More precisely, the present disclosure generally relates to a method and an apparatus for editing and visualizing a light field based image on a user's device, and finds applications in the domain of image or video rendering.

2. BACKGROUND

This section is intended to introduce the reader to various aspects of art, which may be related to various aspects of the present disclosure that are described and/or claimed below. This discussion is believed to be helpful in providing the reader with background information to facilitate a better understanding of the various aspects of the present invention. Accordingly, it should be understood that these statements are to be read in this light, and not as admission of prior art.

Conventional image capture devices project a three-dimensional scene onto a two-dimensional sensor. During operation, a conventional capture device captures a two-dimensional (2-D) image of the scene representing an amount of light that reaches a photosensor (or photodetector) within the device. However, this 2-D image contains no information about the directional distribution of the light rays that reach the photosensor (which may be referred to as the light-field). Direction of incoming light, for example, is lost during such 2D acquisition and information like depth cannot be recovered for a single system. Thus, a conventional capture device does not store most of the information about the light distribution from the scene.

Light-field capture devices (also referred to as "light-field data acquisition devices") have been designed to measure a four-dimensional (4D) light-field of the scene by capturing the light from different viewpoints of that scene. Thus, by measuring the amount of light traveling along each beam of light that intersects the photosensor, these devices can capture additional optical information (information about the directional distribution of the bundle of light rays) for providing new imaging applications by post-processing. The information acquired/obtained by a light-field capture device is referred to as the light-field data. Light-field capture devices are defined herein as any devices that are capable of capturing light-field data. There are several types of light-field capture devices, among which:
  plenoptic devices, which use a microlens array placed between the image sensor and the main lens, as described in document US 2013/0222633;
  a camera array.

The light field data may also be simulated with Computer Generated Imagery (CGI), from a series of 2-D images of a scene each taken from a different viewpoint by the use of a conventional handheld camera.

Light-field data processing comprises notably, but is not limited to, generating refocused images of a scene, generating perspective views of a scene, generating depth maps of a scene, generating extended depth of field (EDOF) images, generating stereoscopic images, and/or any combination of these.

Hence, among others, a 4D Light-Field (4DLF) allows computing various re-focused images with adjustable depth-of-field, focalization distances and viewing positions. However, user experience is often limited to simple rendering on TVs or monitors, 2D computers and mobile displays.

More generally, current light field editing techniques are limited to changing perspective or focus. However, as the number of captured and shared light fields increases, there is an increasing need for editing tools, which would offer the same functions as the well-established editing of 2D images. Actually, image editing programs like Adobe Photoshop® for example provide ways of modifying an object's appearance in a single image by manipulating the pixels of that image.

Nonetheless, the multidimensional nature of light fields may make common image editing tasks become complex in light field space.

First, because a light field is a four-dimensional data structure, while most of the existing editing tools and displays are designed for two-dimensional content. Then, because light fields are redundant and associated with multiple views: the editing task performed on one of these multiple views must be propagated in all views for consistency purpose, which is both cumbersome and time-consuming.

In "*Plenoptic image editing*", *Proceedings of IEEE 6th International Conference on Computer Vision*, 1998, Seitz and Kutulakos presented a method of interactive image editing operations designed to maintain consistency between multiple images of a physical 3D scene: edits to any one image propagates automatically to all other images, as if the 3D scene had itself been modified. Hence, the user can quickly modify many images by editing just a few. Propagation to the other images relies on the use of a plenoptic decomposition into separate shape and radiance components. The propagation mechanism relies on voxel-based reconstruction to obtain pixel correspondence information.

Such a technique focuses on circular 360° light fields, which are either acquired by rotating the camera around the scene, or by rotating the object to be captured (see FIG. 4). Hence, such a technique cannot be directly applied to planar light fields, which are either acquired by a camera array or a plenoptic device.

Moreover, according to this technique, a user needs to navigate through different views of the scene to fully edit the light field, and handle occluded areas: in other words, for some edits which concern occluded areas, the user needs to perform editing on several different images of the scene, in order for it to be propagated to all views of the scene.

This is both cumbersome and time-consuming.

It would be desirable to provide a technique for robustly selecting a surface, or material, in a light field that would show improvements over the prior art. Notably, it would be desirable to provide such a technique, which would enable a user to select materials in a light field without the need to navigate through multiple views, in order to edit them.

3. SUMMARY

According to an embodiment of the present disclosure, a method for selecting at least one surface in a light field is disclosed. The light field is associated with multiple views corresponding to different view points of a same scene. Such a method comprises:
  displaying one of the multiple views as a reference view;
  selecting at least one surface in the reference view;

identifying a set of pixels belonging to the at least one surface, which are occluded in the reference view but visible in at least one of the multiple views;

projecting the set of pixels into the reference view, on the basis of a value of the pixels of the set in the at least one of the multiple views in which they are visible, in order to form an upgraded reference view;

displaying the upgraded reference view;

updating said selected surface in said upgraded reference view.

The present disclosure thus relies on a novel and inventive approach of selection and visualization of materials in light fields. Actually, it allows a user to perform selection of a material, such as a surface or an object, in one reference view, without any need for navigating through all the multiple views associated with the light field to check consistency. To deal with occlusions, the present disclosure relies on projecting the occluded parts in the reference view, so that the user can continue the selection, if needed, in the reference view. Moreover, after visualizing the full surface without occlusion, the user may determine whether all pixels belonging to the surface have been duly selected, or whether the selection should be refined, depending on the type of editing to be performed.

Such a method is faster and easier than prior art methods, according to which the user needs to navigate through all the views to observe the occluded areas and refine the selection in order to guarantee an accurate selection of the surface or material.

It must be noted that the light field dataset may be captured by a plurality of image capture devices (such as a camera array) or by a plenoptic image capture device. It may also be simulated with Computer Generated Imagery (CGI).

According to an embodiment of the present disclosure, such a method also comprises:

detecting at least one foreground object at least partially occluding the at least one selected surface in the reference view;

hiding the at least one foreground object in the upgraded reference view.

Such detection is based on the knowledge of the depth of the points or pixels in the light field, for example based on the associated depth map. If only part of the foreground object occludes the selected surface, this part is hidden.

According to a further embodiment, hiding the at least one foreground object is performed by applying a transparency effect to the object. Hence, the occluding foreground object (or part of it) may either be totally or partially hidden (e.g. with transparent blending). This may help the user get an overall view of the scene.

According to yet a further embodiment, such a method also comprises editing the updated selected surface, and the editing belongs to the group comprising:
- changing color;
- changing texture;
- changing illumination;
- scaling;
- stretching.

More generally, any type of editing commonly performed on a 2D image according to known techniques and existing editing tools may be performed on the surface selected by the user in the light field.

According to yet a further embodiment, the reference view is a central view of the multiple views.

This is particularly interesting when the light field acquisition device is a plenoptic camera, such as a Lytro® camera for example, for accuracy purpose: actually, views located on the periphery of the sensor may be subject to optical deformations.

Embodiments of the present disclosure also concern an apparatus for selecting at least one surface in a light field, the light field being associated with multiple views corresponding to different view points of a same scene. Such an apparatus comprises:

a display unit for displaying one of the multiple views as a reference view and for displaying an upgraded reference view;

a selection tool for selecting at least one surface in the reference view and for updating the selected surface in the upgraded reference view;

a computing module for:
identifying a set of pixels belonging to the at least one surface, which are occluded in the reference view but visible in at least one of the multiple views;

projecting the set of pixels into the reference view, on the basis of a value of the pixels of the set in the at least one of the multiple views in which they are visible, in order to form the upgraded reference view.

According to an embodiment of the present disclosure, such an apparatus also comprises an editing module for editing said updated selected surface.

Such an apparatus may be embedded in a personal computer, a tablet, a smartphone, or any other kind of handheld device.

All features of the description of the user's device described above in relation to embodiments of the method for selecting a surface in a light field also apply to such a user's device or apparatus.

The present disclosure also concerns a computer program product downloadable from a communication network and/or recorded on a medium readable by a computer and/or executable by a processor, comprising program code instructions for implementing a method for editing a light field based image on a user's device as described above.

The present disclosure also concerns a non-transitory computer-readable medium comprising a computer program product recorded thereon and capable of being run by a processor, including program code instructions for implementing a method for editing a light field based image on a user's device as described above.

Such a computer program may be stored on a computer readable storage medium. A computer readable storage medium as used herein is considered a non-transitory storage medium given the inherent capability to store the information therein as well as the inherent capability to provide retrieval of the information therefrom. A computer readable storage medium can be, for example, but is not limited to, an electronic, magnetic, optical, electromagnetic, infrared, or semiconductor system, apparatus, or device, or any suitable combination of the foregoing. It is to be appreciated that the following, while providing more specific examples of computer readable storage mediums to which the present principles can be applied, is merely an illustrative and not exhaustive listing as is readily appreciated by one of ordinary skill in the art: a portable computer diskette; a hard disk; a read-only memory (ROM); an erasable programmable read-only memory (EPROM or Flash memory); a portable compact disc read-only memory (CD-ROM); an optical storage device; a magnetic storage device; or any suitable combination of the foregoing.

It is to be understood that both the foregoing general description and the following detailed description are exemplary and explanatory and are not restrictive of the invention, as claimed.

It must also be understood that references in the specification to "one embodiment" or "an embodiment", indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

4. BRIEF DESCRIPTION OF THE DRAWINGS

Embodiments of the invention can be better understood with reference to the following description and drawings, given by way of example and not limiting the scope of protection, and in which.

The components in the figures are not necessarily to scale, emphasis instead being placed upon illustrating the principles of the invention.

5. DETAILED DESCRIPTION

The general principle of the present disclosure relies on the use of a single reference view associated with a light field to allow a user to select and visualize a surface, or object, that needs editing. For this purpose, occluded parts of the surface are projected onto this reference view, which allows the user to perform the whole selection of the surface, or material, in the reference view, without having to navigate through all the views to check consistency.

A description will now be given of a method, an apparatus and a computer-readable storage medium for editing a light field in embodiments of the present disclosure.

We first recall some general principles applying to light field cameras and images.

Figure 1:
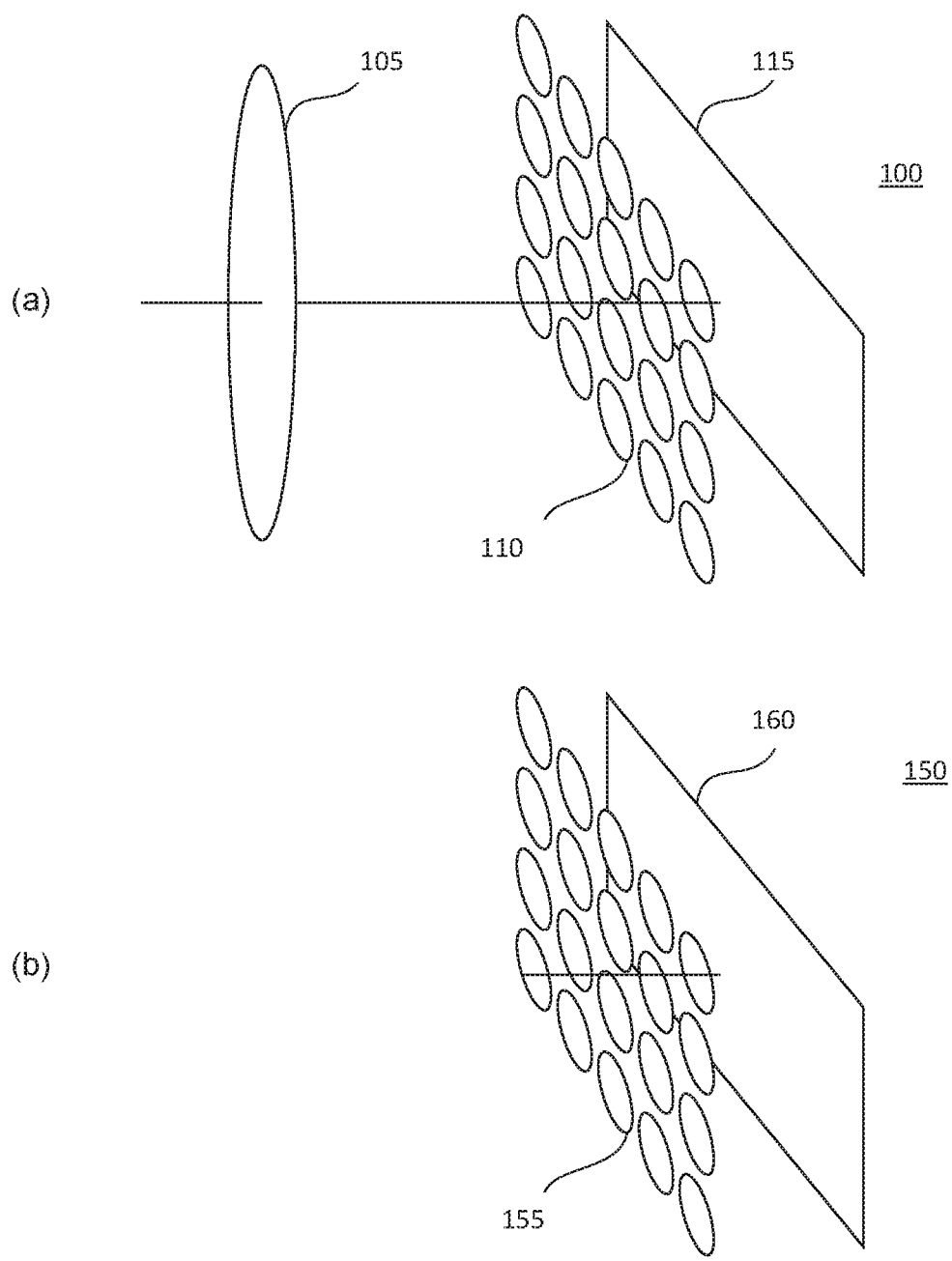
FIG. 1 is a diagram illustrating examples of a plenoptic camera and a multi-array camera.

FIG. 1 is a diagram illustrating examples of a plenoptic camera and a multi-array camera. Light-field cameras are capable of recording 4D light-field data. For instance, 4D light-field cameras may be: a plenoptic camera 200 comprising a main lens 105, a microlens array 110 and an image sensor 115 (FIG. 1A); or a multi-array camera 150 comprising a lens array 155 and a single image sensor 160 (FIG. 1B). For example, a multi-camera array can be a Pelican array camera as the one depicted in the document WO 2014149403 A1.

In the example of the plenoptic camera 100 as shown in FIG. 1A, the main lens 105 receives light from an object (not shown) in an object field of the main lens 105 and passes the light through an image field of the main lens 105. The microlens array 110 includes a plurality of microlenses 115 arranged in a two-dimensional array. Obviously, a main lens 105 and microlenses 115 can be more complex optical systems as the ones depicted for example in FIGS. 12 and 13 of document GB2488905 or document EP2244484 (A1).

Figure 2:
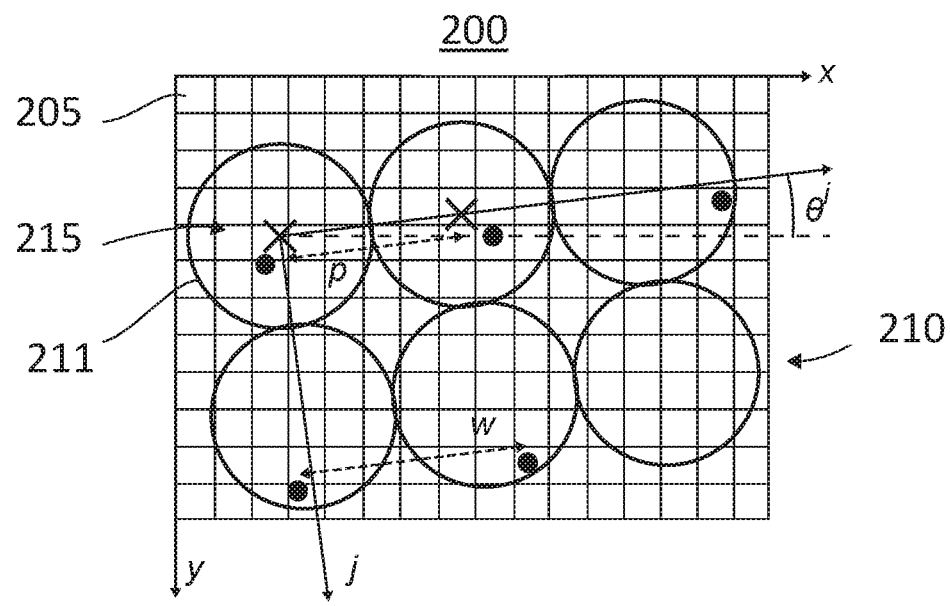
FIG. 2 shows a plan view schematically illustrating an example of sensor regions arranged on the sensing surface of the image sensor.

FIG. 2 is a plan view schematically illustrating an example of sensor regions arranged on the sensing surface of the image sensor. As illustrated in FIG. 2, the image sensor 200 includes a plurality of pixels 205 arranged in a two-dimensional array, and receives the light from the object through the microlens array 210. Each of the microlenses 211 of the microlens array 210 has the lens properties to direct the light to a circular area 215 on the image sensor 200. An outer contour of the circular area 215 may represent the shape of a micro-image formed and captured by a microlens on the image sensor 200, which shape depends on the shape of the microlens 211. Amongst all of the pixels 205 on the image sensor 200, only the pixels 205 located substantially inside the circular area 215 contribute to the imaging. In other words, a pixel area (or sensing area) of pixels 205 that contributes to the imaging is located substantially inside the circular area 215.

The image sensor 200 of light-field camera records an image comprising a collection of 2D micro-images arranged within a 2D image. Each microlens 211 of the microlens array 210 forms a micro-image represented by a circular area 215. Coordinates of pixels 205 on the sensor 200 is indicated by (x,y) in the x-y coordinate system on the surface of the image sensor 200 as shown in FIG. 2. The distance p shown in FIG. 2 is the distance between the two consecutive micro-images. Microlenses 211 are chosen such that the distance p is larger than the size of the pixel 205. The distance w shown in FIG. 2 is the disparity distance between the two consecutive micro-images. Micro-images are referred by their respective coordinate (i,j) in the i-j coordinate system on the surface of the image sensor 200 as shown in FIG. 2.

As mentioned above, only the pixels 205 located substantially inside the circular area 215 receive the light through the microlens 211. The inter microlens space may be masked out to prevent photons to pass outside a microlens 211 (if the microlenses 211 have a square shape and the inter microlens space is not formed, such a masking is not needed).

The center of a micro-image (i,j) is located on the image sensor 200 at the coordinate $(x_{i,j}, y_{i,j})$. The θ in FIG. 2 represents the angle between the square lattice of pixels 205 and the square lattice of microlenses 211. The coordinate $(x_{i,j}, y_{i,j})$ can be deduced by the following equation (1) considering $(x_{0,0}, y_{0,0})$ which is the pixel coordinate of the microlens image (0,0):

$$\begin{bmatrix} x_{i,j} \\ y_{i,j} \end{bmatrix} = p \begin{bmatrix} \cos\theta & -\sin\theta \\ \sin\theta & \cos\theta \end{bmatrix} \begin{bmatrix} i \\ j \end{bmatrix} + \begin{bmatrix} x_{0,0} \\ y_{0,0} \end{bmatrix} \quad (1)$$

The distances p and w are given in unit of pixel. They are converted into physical unit of distance (meters) P and W, respectively, by multiplying the pixel size δ: W=δw and P=δp. These distances depend on the characteristics of the light field camera.

In the state of the art, there are several ways to represent (or define) 4D light-field data. Indeed, in the Chapter 3.3 of the Phd dissertation thesis entitled "Digital Light Field Photography" by Ren Ng, published in July 2006, three different ways to represent 4D light-field data are described. Firstly, a 4D light-field data can be represented, when recorded by a plenoptic camera as the one depicted in FIG. 1(a) for example, by a collection of micro-lens images. 4D light-field data in this representation are named raw images (or raw 4D light-field data). Secondly, 4D light-field data can be represented, either when recorded by a plenoptic camera or by a camera array, by a set of sub-aperture images. A sub-aperture image corresponds to a captured image of a scene from a point of view, the point of view being slightly different between two sub-aperture images. These sub-aperture images give information about the parallax and depth of the imaged scene. Thirdly, 4D light-field data can be represented by a set of epipolar images (see for example the article entitled "Generating EPI Representation of a 4D Light Fields with a Single Lens Focused Plenoptic Camera", by S. Wanner et al., published in the conference proceedings of ISVC 2011).

Figure 3A:
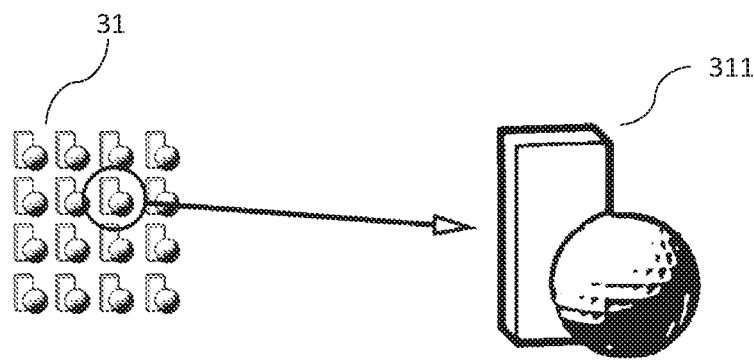
FIGS. 3A-3B-3C illustrate embodiments of the present disclosure, in which a surface is selected in a reference view of a light-field, for editing purpose.

In the embodiment of FIG. 3A, the plenoptic capture 31 may be displayed as a 4×4 matrix of views, or sub-aperture images. All sixteen views illustrate the same scene, seen under a different angle, or point of view. According to an embodiment of the present disclosure, one of the views of matrix 31 is selected as a reference view 311. In a preferred embodiment, such a reference view 311 is a central view of the multiple views 31. This is particularly interesting when the light field acquisition device is a plenoptic camera, such as a Lytro® camera for example, for accuracy purpose: actually, views located on the periphery of the sensor may be subject to optical deformations. However, any view of the matrix 31 of views may be selected as a reference view.

Reference view 311 illustrates a parallelepiped rectangle in the background, which is partially occluded by a ball in the foreground.

Figure 3B:
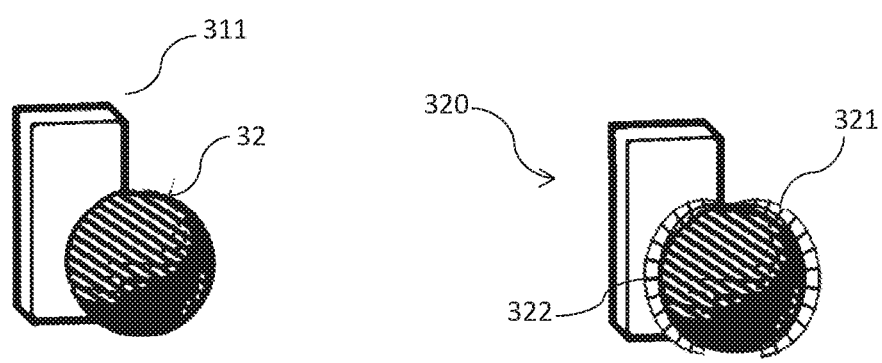

FIG. 3B illustrates a first exemplary embodiment, in which the user wishes to edit the surface of the ball 32. As illustrated by dashed lines on the left-hand part of FIG. 3B, the user selects the surface 32 on reference view 311. According to embodiments of the present disclosure, the other views of matrix 31 will be used to determine the values of the pixels belonging to the surface of the ball 32, which are self-occluded in reference view 311. The values of these self-occluded pixels are then projected onto reference view 311, in order to form an upgraded reference view 320. On upgraded reference view 320, there are two sets of projected pixels 321 and 322, which values are extracted from extrema views of matrix 31, on which these set of pixels are visible. The projected pixels 321, 322 have a robust match to the other views of the light field where they are visible, in the sense that the mapping is well-defined, i.e. for a point in an extrema view, there is only one corresponding point in the reference view 311.

Figure 3C:
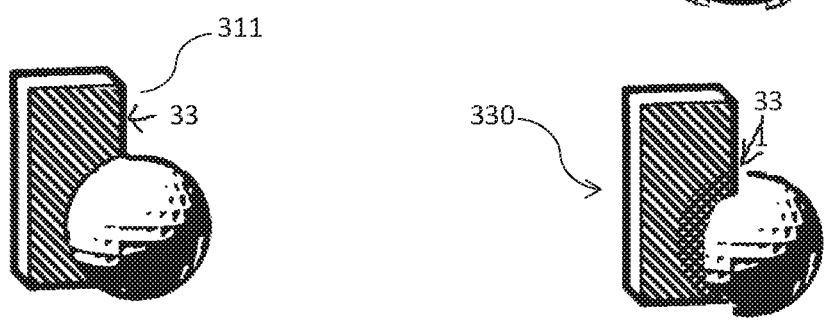

FIG. 3C illustrates a second exemplary embodiment, in which the user wishes to edit the front surface 33 of the parallelepiped rectangle. As illustrated by dashed lines on the left-hand part of FIG. 3C, the user selects the surface 33 on reference view 311.

The ball in the foreground partially occludes this surface 33, as may be easily detected by using the depth map: the depth of the selected area 33 ds is bigger than the depth of the occluding surface $d_{occ}$. However, there are views in the matrix of views 31, in which pixels belonging to surface 33, which are occluded in reference view 311, are visible.

According to embodiments of the present disclosure, the occluding part of the foreground ball is hidden, and the occluded pixels of surface 33 are projected onto reference view 311, using their values in other views of matrix 31 where they are visible, to form an upgraded reference view 330. The projected pixels are denoted as 331 on FIG. 3C. The occluding part of the foreground ball may either be totally erased, or hidden by applying a transparency effect.

The user may visualize the upgraded reference views 320 and 330, and continue the selection process visualizing the full surface without occlusion (whether self-occlusion in the first embodiment of FIG. 3B or occlusion by a foreground object in the second embodiment of FIG. 3C). He/she may notably check that all desired pixels are indeed selected. Such a selection, and subsequent editing, may be performed by using existing 2D image selection tools, such as Photoshop® for example.

Figure 4:
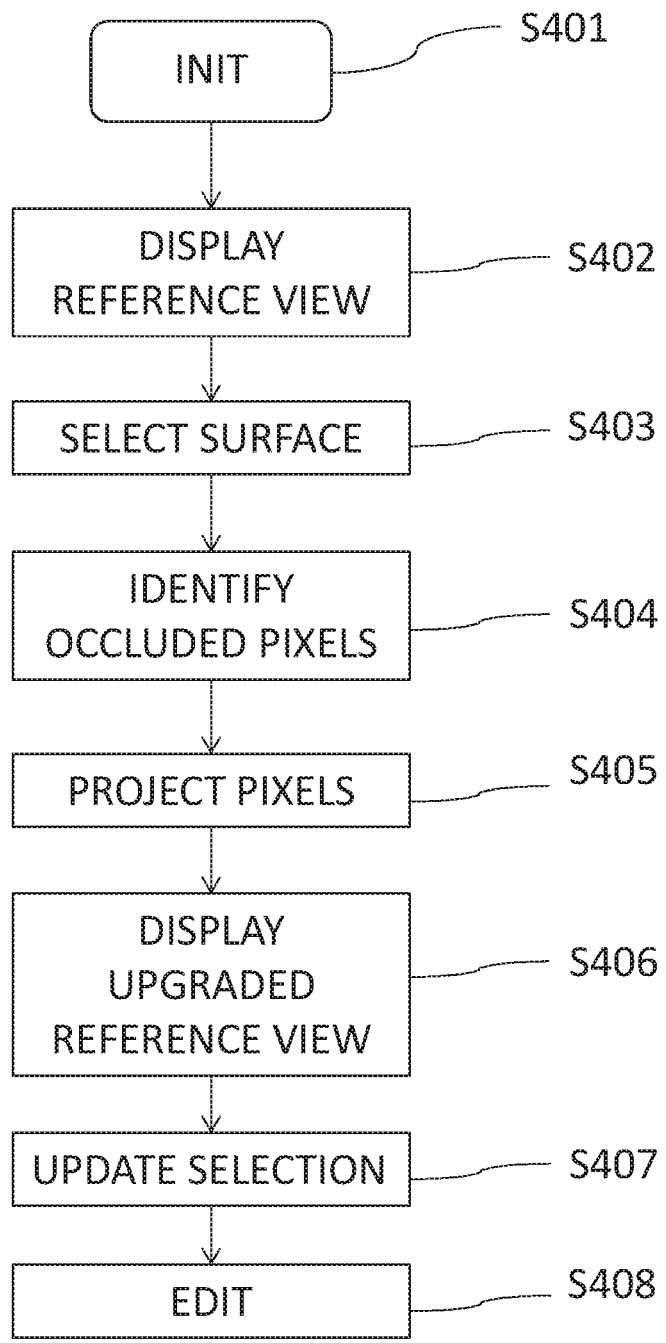
FIG. 4 is a flow chart for explaining a process for editing a light-field according to an embodiment of the present disclosure.

FIG. 4 shows a flow chart illustrating a process for editing a light-field based image according to an embodiment of the present disclosure.

Step S401 corresponds to an initialization step, during which the matrix of views 31 of FIG. 3A may be acquired from a light-field acquisition device: a view of the matrix of views 31 is selected as a reference view 311. At step S402, this reference view 311 is displayed on a user's device, such as a personal computer, a tablet or a smartphone for example.

At step S403, the user selects a surface, or a material, on the displayed reference view 311. The user may perform such a selection by using a mouse, or any other selection tool on the user interface of the user's device. The segmentation of the surface could be pre-computed, for example using methods like the ones disclosed by Hog et al. in "Light Field Segmentation Using a Ray-Based Graph Structure", 2016, European Conference on Computer Vision (Springer International Publishing), or could be done interactively using existing tools for 2D image selection like "Lazy Snapping" or "Magic Wand" from Photoshop®.

At step S404, pixels belonging to the selected surface, which are not visible in the reference view, but visible in at least one other view of the matrix of views 31 are identified. Such pixels may either be self-occluded pixels, i.e. pixels which are occluded by the surface to which they belong itself, or be occluded by a foreground object.

At step S405, the identified occluded pixels are projected onto the reference view 311, using their value in the view(s) in which they are visible. The reference view 311 is hence upgraded into a new reference view 320 or 330, in which all occluded parts of the selected surface are visible. In case when some pixels belonging to the surface are occluded by a foreground object, this object may be partially erased or hidden at step S405 as well.

At step S406, this upgraded reference view 320 or 330 is displayed on the user's device: the user may hence check that all relevant pixels are duly selected, by visualizing the full surface of interest without occlusion. If not, the user may update the surface selection at step S407.

Thanks to this embodiment of the present disclosure, the user does not need to navigate through all the views of matrix 31 to check that the material selection had been properly done. Actually, the user may robustly select materials in a light field without the need to navigate through the views to fix inconsistencies caused by occlusions or non-Lambertian materials. Moreover, thanks to the projection of the occlusions onto the reference view, existing 2D image selection tools may be used to select the surface of interest on the upgraded reference view. The user is therefore able to coherently select pixels across multiple views in a light field by selecting pixels in only one reference view.

At step S408, the user may edit the selected surface, for example by changing its color or its glossiness. More generally, thanks to the embodiments of the present disclosure, any 2D image edits that require selection of coherent regions can be applied to the light field associated with the matrix of views 31, thereby significantly expanding the range of edits available for light fields.

We now explain in greater details a possible embodiment of the present disclosure as regards steps S403 to S405 in FIG. 4, which is based on projection mapping techniques. It must be noted that alternative methods based on patch match optimization could also be used, such as the ones disclosed by Thonat, T., Shechtman, E., Paris, S., & Drettakis, G. (2016) in "*Multi-View Inpainting for Image-Based Scene Editing and Rendering*", Fourth International Conference on 3D Vision (3DV).

Assume that a 3D point cloud P is computed from the light field using existing techniques, such as the one disclosed by Sabater, N., Boisson, G., Vandame, B., Kerbiriou, P., Babon, F., Hog, M., et al. (2017) in "*Dataset and Pipeline for Multi-view Light-Field Video*", Proceedings of the IEEE Conference on Computer Vision and Pattern Recognition Workshops. It is then possible to define the set of points S that belong to the surface being selected as:

$$S=\{(x,y,z)|(x,y,z)\in P\}$$

Among these points, due to the camera location and occlusion of the scene, there are some points, which are visible in the reference view 311 and some points, which are hidden. The reference view is associated with a camera projection function proj$\theta$, which is known a priori, and returns the coordinates of each 3D point in 2D image space:

$$(px,py)=\text{proj}\theta(x,y,z).$$

$S_{hidden}$ are points which belong to the surface S selected at step S403 but which are not visible in the reference view 311:

$$S_{hidden}=\{(x,y,z)|(x,y,z)\in S \wedge h_{proj\theta}(x,y,z)=0\},$$

where $h_{proj\theta}(x,y,z)$ is a visibility function, with value 1 if the point (x,y,z) is visible in the reference view 311, and 0 otherwise. The visibility function $h_{proj\theta}$ depends on the camera projection parameters defined by proj$\theta$.

Then, it is possible to define another set of points $S_{ext}$ by expanding the set of points $S_{hidden}$ to include points from the visible part of the selected surface S up to a radius, which could be set e.g. to the twenty nearest neighbor points in 3D space.

With existing techniques, such as the one disclosed by Kazhdan, M. &. (2013) in "*Screened poisson surface reconstruction*", ACM Transactions on Graphics (TOG), 32(3), 29, a 3D mesh can be reconstructed from the set of points $S_{ext}$, resulting in a set of vertices: $\{v\}$.

At step S404, if there is an object occluding the selected surface, the proposed method will hide totally or partially (with transparent blending) the points that belong to such occluding object. These points are found as those with the same 2D image projection as the hidden points, but visible from the reference view.

$$O=\{(x,y,z)|\text{Proj}(x,y,z)=\text{Proj}(x',y',z') \wedge (x',y',z')\in S_{hidden} \wedge (x,y,z)\notin S \wedge h_{proj\theta}(x,y,z)=1\}$$

Note that these points need not to belong to the same surface being selected.

At step S405, for projecting the hidden points into the reference view 311, it is built a new 2D planar domain parametrized by u=(t,s), which is local over the area given by the expanded convex hull of the projected points Proj$\theta$ ($S_{ext}$). The amount of expansion of the convex hull might vary depending on image resolution and can be e.g. fifty pixels. Then, the goal is to find a mapping between the 3D mesh $\{v\}$ computed from $S_{ext}$ and the planar domain u subject to certain constraints. These constraints are given by the points which are already visible in the reference view 311 $S_{visible}=\{S_{ext}-S_{hidden}\}$ whose projection is known and fixed $\{u_{fixed}\}$. The mapping is represented by a vector u(v)=[t(v); s(v)]. The mapping is parameterized by a uniform grid, where each cell of the grid is a quadrilateral. For each point of the mesh $\{v\}$, the value of its corresponding point u in the output domain is computed via the following optimization:

$$\min_{u,T}\sum_{i=1}^{M}\lambda_1|u_i-u_{fixed}|^2+\lambda_2|u_i-T_i(v_i)|^2+\lambda_3|\mathcal{L}(u_i)-\mathcal{L}(v_i)|^2$$

where the first term represents the point constraint, corresponding to the points already visible in the reference view 311 that will serve as anchor points. The second term is the projection constraint, where $T_i$ is the transformation function that it is needed to apply to the vertex of the mesh. The third term, is the structural constraint, and it guarantees the smoothness and continuity of the result. In this case, $\mathcal{L}$ is the Laplacian function per vertex as defined by Sorkine, O., Cohen-Or, D., Lipman, Y., Alexa, M., Rössi, C., & Seidel, H. P. (2004) in "*Laplacian Surface Editing*", Eurographics/ACM SIGGRAPH symposium on Geometry processing, but alternatives could be used (see for example Igarashi, T. I. (2009) "*Implementing As-Rigid-As-Possible Shape Manipulation and Surface Flattening*", Journal of Graphics, GPU, and Game Tools). Both u and T can be solved by linear least squares optimization, for example, following the approach disclosed by Igarashi in the above document. The constants $\lambda_1$, $\lambda_2$, and $\lambda_3$ control the degree of influence of each term and can be tuned by the user. M is the number of points of the mesh $\{v\}$.

Figure 5:
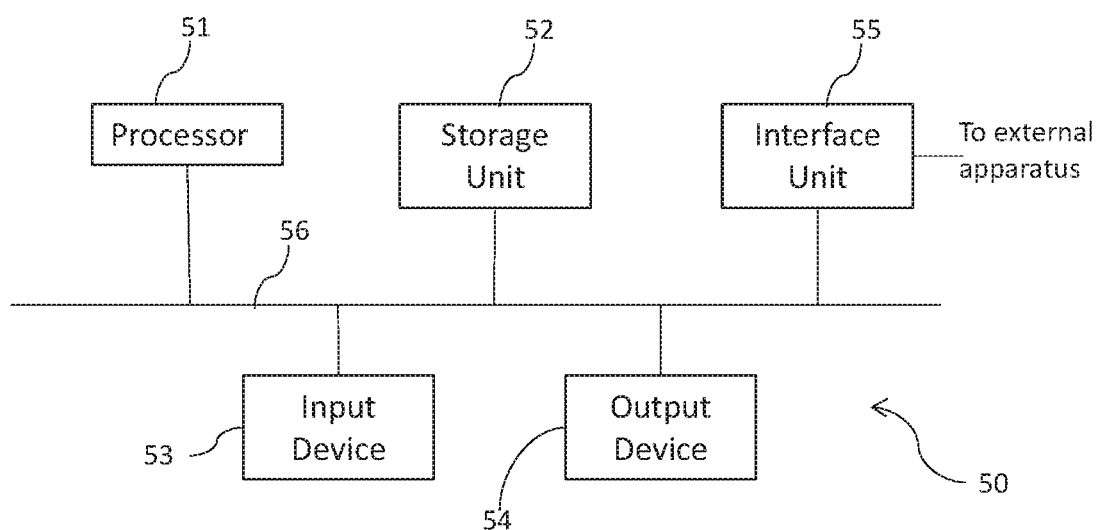
FIG. 5 is a schematic block diagram illustrating an example of an apparatus for editing a light-field according to an embodiment of the present disclosure.

FIG. 5 is a schematic block diagram illustrating an example of an apparatus for editing a light field based image, according to an embodiment of the present disclosure.

An apparatus 50 illustrated in FIG. 5 includes a processor 51, a storage unit 52, an input device 53, an output device 54, and an interface unit 55 which are connected by a bus 56. Of course, constituent elements of the computer apparatus 50 may be connected by a connection other than a bus connection using the bus 56. Such an apparatus 50 is for example a Personal Computer, a tablet, or any other type of handheld device, such as a smartphone.

The processor 51 controls operations of the apparatus 50. The storage unit 52 stores at least one program to be executed by the processor 51, and various data, including data of 4D light field images captured and provided by a light field camera, parameters used by computations performed by the processor 51, intermediate data of computations performed by the processor 51, and so on. The processor 51 may be formed by any known and suitable hardware, or software, or a combination of hardware and software. For example, the processor 51 may be formed by dedicated hardware such as a processing circuit, or by a programmable processing unit such as a CPU (Central Processing Unit) that executes a program stored in a memory thereof.

The storage unit 52 may be formed by any suitable storage or means capable of storing the program, data, or the like in a computer-readable manner. Examples of the storage unit 52 include non-transitory computer-readable storage media such as semiconductor memory devices, and magnetic, optical, or magneto-optical recording media loaded into a read and write unit. The program causes the processor 51 to perform a process for editing a light field according to an embodiment of the present disclosure as described above with reference to FIG. 4.

The input device 53 may be formed by a keyboard, a pointing device such as a mouse, or the like for use by the user to input commands and select surfaces or objects on a reference view. The output device 54 may be formed by a display device to display, for example, a Graphical User Interface (GUI), or a reference view of the light field, or an upgraded reference view, onto which occluded pixels have been projected, according to embodiments of the present disclosure. The input device 53 and the output device 54 may be formed integrally by a touchscreen panel, for example.

The interface unit 55 provides an interface between the apparatus 50 and an external apparatus. The interface unit 55 may be communicable with the external apparatus via cable or wireless communication. In this embodiment, the external apparatus may be a light field camera. In this case, data of 4D light field images captured by the light field camera can be input from the light field camera to the apparatus 50 through the interface unit 55, then stored in the storage unit 52, and displayed on screen 54.

The apparatus 50 and the light field camera may communicate with each other via cable or wireless communication.

Although only one processor 51 is shown on FIG. 5, it must be understood that such a processor may comprise different modules and units embodying the functions carried out by apparatus 50 according to embodiments of the present disclosure, such as:
- a selection tool for selecting a surface in the reference view displayed on output device 54 and for updating the selected surface in the upgraded reference view displayed on output device 54;
- a computing module for:
  - identifying a set of pixels belonging to the selected surface, which are occluded in the reference view but visible in another view;
  - projecting the set of pixels into the reference view, on the basis of a value of these pixels in the other view in which they are visible, in order to form the upgraded reference view;
- an editing module for editing the updated selected surface.

These modules and units may also be embodied in several processors 51 communicating and co-operating with each other.

As will be appreciated by one skilled in the art, aspects of the present principles can be embodied as a system, method or computer readable medium. Accordingly, aspects of the present principles can take the form of an entirely hardware embodiment, an entirely software embodiment (including firmware, resident software, micro-code, and so forth), or an embodiment combining software and hardware aspects that can all generally be referred to herein as a "circuit", "module", or "system".

When the present principles are implemented by one or several hardware components, it can be noted that an hardware component comprises a processor that is an integrated circuit such as a central processing unit, and/or a microprocessor, and/or an Application-specific integrated circuit (ASIC), and/or an Application-specific instruction-set processor (ASIP), and/or a graphics processing unit (GPU), and/or a physics processing unit (PPU), and/or a digital signal processor (DSP), and/or an image processor, and/or a coprocessor, and/or a floating-point unit, and/or a network processor, and/or an audio processor, and/or a multi-core processor. Moreover, the hardware component can also comprise a baseband processor (comprising for example memory units, and a firmware) and/or radio electronic circuits (that can comprise antennas) which receive or transmit radio signals. In one embodiment, the hardware component is compliant with one or more standards such as ISO/IEC 18092/ECMA-340, ISO/IEC 21481/ECMA-352, GSMA, StoLPaN, ETSI/SCP (Smart Card Platform), GlobalPlatform (i.e. a secure element). In a variant, the hardware component is a Radio-frequency identification (RFID) tag. In one embodiment, a hardware component comprises circuits that enable Bluetooth communications, and/or Wi-fi communications, and/or Zigbee communications, and/or USB communications and/or Firewire communications and/or NFC (for Near Field) communications.

Furthermore, aspects of the present principles can take the form of a computer readable storage medium. Any combination of one or more computer readable storage medium(s) may be utilized.

Thus for example, it will be appreciated by those skilled in the art that the block diagrams presented herein represent conceptual views of illustrative system components and/or circuitry embodying the principles of the invention. Similarly, it will be appreciated that any flow charts, flow diagrams, state transition diagrams, pseudo code, and the like represent various processes which may be substantially represented in computer readable storage media and so executed by a computer or a processor, whether or not such computer or processor is explicitly shown.

Although the present disclosure has been described with reference to one or more examples, workers skilled in the art will recognize that changes may be made in form and detail without departing from the scope of the disclosure and/or the appended claims.

The invention claimed is:

1. A method for selecting at least one surface in a light field, said light field being associated with multiple views corresponding to different view points of a same scene, wherein the method comprises:
   selecting one of said multiple views as a reference view;
   selecting at least one surface in said reference view;
   identifying a set of pixels belonging to said at least one surface, which are occluded in said reference view but visible in at least one of said multiple views;
   projecting said set of pixels into said reference view, on the basis of a value of said pixels of said set in said at least one of said multiple views in which they are visible, in order to form an upgraded reference view;
   updating said selected surface in said upgraded reference view.

2. The method of claim 1, further comprising:
   detecting at least one foreground object at least partially occluding said at least one surface in said reference view;
   hiding said at least one foreground object in said upgraded reference view.

3. The method of claim 2, wherein hiding said at least one foreground object comprises applying a transparency effect to said object.

4. The method of claim 3, further comprising editing said updated selected surface, and wherein said editing belongs to the group comprising:

changing color;
changing texture;
changing illumination;
scaling;
stretching.

5. The method according to claim 4, wherein said reference view is a central view of said multiple views.

6. The method of claim 1 further comprising:
displaying the reference view before selecting the at least one surface; and
displaying the upgraded reference view before updating the selected surface in the upgraded reference view.

7. An apparatus for selecting at least one surface in a light field, said light field being associated with multiple views corresponding to different view points of a same scene, wherein the apparatus comprises:
one or more processors configured to
select one of said multiple views as a reference view;
select at least one surface in said reference view;
identify a set of pixels belonging to said at least one surface, which are occluded in said reference view but visible in at least one of said multiple views;
projecting said set of pixels into said reference view, on the basis of a value of said pixels of said set in said at least one of said multiple views in which they are visible, in order to form an upgraded reference view;
update said selected surface in said upgraded reference view.

8. The apparatus of claim 7, wherein the one or more processors being further configured to perform an edit of said updated selected surface, and wherein the edit belongs to the group comprising:
changing color;
changing texture;
changing illumination;
scaling;
stretching.

9. The apparatus of claim 7, wherein the one or more processors being further configured to:
detect at least one foreground object at least partially occluding said at least one surface in said reference view;
hide said at least one foreground object in said upgraded reference view.

10. The apparatus of claim 9, wherein the one or more processors being further configured to hide said at least one foreground object comprises the one or more processors being configured to apply a transparency effect to said object.

11. The apparatus of claim 7, wherein the one or more processors are further configured to
display the reference view before selecting the at least one surface; and
display the upgraded reference view before updating the selected surface in the upgraded reference view.

12. The apparatus of claim 10, wherein said reference view is a central view of said multiple views.

13. A non-transitory computer-readable medium storing program code instructions executable by a processor for selecting at least one surface in a light field, said light field being associated with multiple views corresponding to different view points of a same scene, and for performing operations comprising:
selecting one of said multiple views as a reference view;
selecting at least one surface in said reference view;
identifying a set of pixels belonging to said at least one surface, which are occluded in said reference view but visible in at least one of said multiple views;
projecting said set of pixels into said reference view, on the basis of a value of said pixels of said set in said at least one of said multiple views in which they are visible, in order to form an upgraded reference view;
updating said selected surface in said upgraded reference view.

14. The non-transitory computer-readable medium of claim 13, wherein the operations performed by the processor executing the stored program code instructions further comprise:
detecting at least one foreground object at least partially occluding said at least one surface in said reference view;
hiding said at least one foreground object in said upgraded reference view.

15. The non-transitory computer-readable medium of claim 14, wherein the operation hiding said at least one foreground object performed by the processor executing the stored program code instructions comprises applying a transparency effect to said object.

16. The non-transitory computer-readable medium of claim 13, wherein the operations performed by the processor executing the stored program code instructions further comprise editing said updated selected surface, and wherein said editing belongs to the group comprising:
changing color;
changing texture;
changing illumination;
scaling;
stretching.

17. The non-transitory computer-readable medium of claim 16, wherein said reference view is a central view of said multiple views.

18. The non-transitory computer-readable medium of claim 13, wherein the operations performed by the processor executing the stored program code instructions further comprise:
displaying the reference view before selecting the at least one surface in said reference view; and
displaying the upgraded reference view before updating the selected surface in the upgraded reference view.

* * * * *